United States Patent
Kobayashi

(10) Patent No.: US 9,143,998 B2
(45) Date of Patent: Sep. 22, 2015

(54) APPARATUS AND METHOD FOR PERFORMING HANDOVER IN A WIRELESS COMMUNICATION NETWORK

(75) Inventor: Noboru Kobayashi, Kawasaki (JP)

(73) Assignee: FUJITSU, LIMITED, Kawasaki (JP)

( * ) Notice: Subject to any disclaimer, the term of this patent is extended or adjusted under 35 U.S.C. 154(b) by 283 days.

(21) Appl. No.: 13/349,065

(22) Filed: Jan. 12, 2012

(65) Prior Publication Data

US 2012/0214490 A1 Aug. 23, 2012

(30) Foreign Application Priority Data

Feb. 17, 2011 (JP) ................................ 2011-032472

(51) Int. Cl.
*H04W 36/00* (2009.01)
*H04W 36/20* (2009.01)
*H04B 7/08* (2006.01)
(Continued)

(52) U.S. Cl.
CPC ............... *H04W 36/20* (2013.01); *H04B 7/086* (2013.01); *H04B 17/24* (2015.01); *H04B 17/382* (2015.01)

(58) Field of Classification Search
CPC ....... H04W 36/30; H04W 64/00; H04W 4/02; H04W 88/08; H04W 52/24; H04W 16/18; H04W 16/28; H04W 88/14; H04W 80/04; H04B 7/0669; H04B 1/086; H01Q 21/28; H04L 47/10; H04L 7/042; H04L 1/06; H03G 3/3052; G01S 5/12
USPC ........ 455/436, 456.1, 456.2, 456.3, 561, 522, 455/446, 101, 562.1, 560, 269, 272; 370/235, 331; 342/357.2; 375/343, 375/347, 345

IPC ...... H04B 1/38,1/06; H04M 1/00; H04W 28/08
See application file for complete search history.

(56) References Cited

U.S. PATENT DOCUMENTS 7,145,886 B1* 12/2006 Kitade et al. .................. 370/320
2003/0114195 A1* 6/2003 Chitrapu et al. .............. 455/562
(Continued)

FOREIGN PATENT DOCUMENTS

JP 2002-185998 A 6/2002
JP 2004-88266 3/2004
(Continued)

OTHER PUBLICATIONS

Notification of Reasons for Refusal issued for corresponding Japanese patent application No. 2011-032472, dispatched Mar. 11, 2014, with English translation.

*Primary Examiner* — Charles Appiah
*Assistant Examiner* — Alexander Yi
(74) *Attorney, Agent, or Firm* — Myers Wolin, LLC

(57) ABSTRACT

A base transceiver station receives first and second reception power values from a plurality of user equipments. The first reception power value is a reception power value at which a user equipment receives a radio signal from another base transceiver station without using a reception beam formation function that allows a radio signal transmitted from a predetermined direction to be selectively received with increased reception sensitivity. The second reception power value is a reception power value at which a user equipment receives a radio signal from another base transceiver station using the reception beam formation function. The base transceiver station selects, from among the plurality of user equipments, a user equipment to be handed over based on the first and second reception power values, and performs handover processing on the selected user equipment.

12 Claims, 9 Drawing Sheets

(51) Int. Cl.
   *H04B 17/24* (2015.01)
   *H04B 17/382* (2015.01)

(56) References Cited

U.S. PATENT DOCUMENTS

| | | | |
|---|---|---|---|
| 2003/0114196 A1 | 6/2003 | Chitrapu | |
| 2003/0117943 A1* | 6/2003 | Sakata et al. | 370/210 |
| 2003/0119559 A1 | 6/2003 | Chitrapu | |
| 2004/0038713 A1 | 2/2004 | Okawa et al. | |
| 2005/0176468 A1* | 8/2005 | Iacono et al. | 455/562.1 |
| 2006/0133544 A1* | 6/2006 | Kawada et al. | 375/343 |
| 2009/0028112 A1 | 1/2009 | Attar et al. | |
| 2009/0325624 A1* | 12/2009 | Centonza | 455/522 |
| 2011/0002221 A1* | 1/2011 | Turk et al. | 370/235 |

FOREIGN PATENT DOCUMENTS

| | | |
|---|---|---|
| JP | 2006-115491 | 4/2006 |
| JP | 2006-157528 A | 6/2006 |
| JP | 2007-525893 | 9/2007 |
| JP | 2010-522506 | 7/2010 |

* cited by examiner

APPARATUS AND METHOD FOR PERFORMING HANDOVER IN A WIRELESS COMMUNICATION NETWORK

CROSS-REFERENCE TO RELATED APPLICATION

This application is based upon and claims the benefit of priority of the prior Japanese Patent Application No. 2011-032472, filed on Feb. 17, 2011, the entire contents of which are incorporated herein by reference.

FIELD

The present invention relates to an apparatus and method for performing handover in a wireless communication network.

BACKGROUND

It has been known that a piece of user equipment (UE) such as a mobile phone changes a base transceiver station (BTS) with which the user equipment is wirelessly communicating, to another base transceiver station, when the user equipment moves. In the description below, changing a base transceiver station with which a piece of user equipment is communicating to another base transceiver station will be referred to as a handover (HO). Further, for ease of explanation, "a piece of user equipment" will be also expressed as "a user equipment" or abbreviated as "a UE".

When many user equipments gather in the area of the particular base transceiver station and the communication load imposed on a particular base transceiver station is increased, the base transceiver station having the increased communication load may hand over some user equipments being located within the area thereof to another base transceiver station having a small communication load. Hereinafter, another base transceiver station to which a handover is performed will be also expressed as "a handover-destination base transceiver station" or abbreviated as "a HO-destination BTS", and a base station from which a handover is performed will be also expressed as "a handover-source base transceiver station" or abbreviated as "a HO-source BTS". In this way, communication loads are leveled between a handover-source base transceiver station and a handover-destination base transceiver station.

In this case, the base transceiver station may select, as a user equipment to be handed over, a user equipment that receives a radio signal from a handover-destination base transceiver station with a large reception power value, from among the multiple user equipments so that a proper wireless communication speed can be ensured after the user equipment is handed over to the handover-destination base transceiver station.

However, in the related art such as Japanese National Publication of International Patent Application No. 2007-525893, selection of a user equipment to be handed over is performed without taking into account differences in reception performance among multiple user equipments.

For example, when multiple user equipments exhibit approximately the same radio signal reception performance, the reception power value of each user equipment reflects the distance between the user equipment and a handover-destination base transceiver station. However, multiple user equipments may include ones having a reception beam formation function by which a radio signal transmitted from a particular direction is selectively received with increased reception sensitivity, and ones not having the reception beam formation function. Accordingly, the multiple user equipments differ from one another in radio signal reception performance.

Further, even user equipments having reception beam formation functions may differ from one another in the performance of the reception beam formation functions. As a result, the user equipments differ from one another in radio signal reception performance. Accordingly, the reception power value of a user equipment may fail to correctly reflect the distance between the user equipment and the handover-destination base transceiver station.

For example, suppose that one of multiple user equipments C and D, which are communicating with base transceiver station A, is handed over to handover-destination base transceiver station B. Assume that the user equipment C is distant from handover-destination base transceiver station B and close to base transceiver station A, and the user equipment C has the reception beam formation function that is oriented to handover-destination base transceiver station B. Also assume that the user equipment D is close to handover-destination base transceiver station B and distant from base transceiver station A, and the user equipment D does not have the reception beam formation function. Since the user equipment C has higher reception performance, the reception power value of a radio signal received by the user equipment C from handover-destination base transceiver station B may be larger than the reception power value of a radio signal received by the user equipment D from handover-destination base transceiver station B. Thus, although user equipment C is more distant from handover-destination base transceiver station B, base transceiver station A may select the user equipment C as a user equipment to be handed over to handover-destination base transceiver station B.

In this case, radio signals transmitted between the user equipment C and handover-destination base transceiver station B may significantly interfere with radio signals transmitted or received by other user equipments belonging to base transceiver station A. For example, base transceiver station A is able to assign wireless resources such as frequencies to user equipments belonging to base transceiver station A so as to reduce interference between the user equipments as much as possible, whereas base transceiver station A is unable to grasp the wireless resources assigned to user equipments belonging to handover-destination base transceiver station B. In addition, there may be many user equipments belonging to base transceiver station A and communicating therewith around user equipment C that is close to base transceiver station A. Further, since user equipment C is distant from handover-destination base transceiver station B, it consumes a large transmission power to transmit a radio signal to handover-destination base transceiver station B. For these reasons, the handover of user equipment C to handover-destination base transceiver station B is considered to significantly increase interference between first radio signals transmitted between user equipment C and handover-destination base transceiver station B, and second radio signals used by the other user equipments belonging to base transceiver station A.

Further, when a user equipment that is close to a handover-destination base transceiver station is simply selected as a candidate user equipment to be handed over, wireless communication may not be favorably performed between the selected user equipment and the handover-destination base transceiver station if the user equipment has poor reception performance.

SUMMARY

According to an aspect of an embodiment, there is provided an apparatus and method for performing handover from a base transceiver station to another base transceiver station in a wireless communication network in which a plurality of user equipments are allowed to communicate with the base transceiver station. The plurality of user equipments includes a set of one or more user equipments each having a reception beam formation function that allows a radio signal transmitted from a predetermined direction to be selectively received with increased reception sensitivity. The base transceiver station receives, from each of the plurality of user equipments, a first reception power value that is a reception power value at which the each of the plurality of user equipments receives a radio signal from the another base transceiver station without using the reception beam formation function. The base transceiver station further receives, from each of the set of one or more user equipments, a second reception power value that is a reception power value at which the each of the set of one or more user equipments receives a radio signal from the another base transceiver station using the reception beam formation function. The base transceiver station selects, from among the plurality of user equipments, a user equipment to be handed over, based on the first reception values received from the plurality of user equipments and the second reception power values received from the set of one or more user equipment. Then, the base transceiver station performs handover processing on the selected user equipment so that an accessible base transceiver station with which the user equipment is communicating is changed from the base transceiver station to the another base transceiver station.

The object and advantages of the invention will be realized and attained by means of the elements and combinations particularly pointed out in the claims.

It is to be understood that both the foregoing general description and following detailed description are exemplary and explanatory and are not restrictive of the invention, as claimed.

DESCRIPTION OF EMBODIMENTS

First Embodiment

Base transceiver stations, user equipments, wireless communication systems, and handover methods according to embodiments of the present invention will be described in detail with reference to the accompanying drawings. However, the present invention is not limited to those embodiments. For example, although a mobile phone is used as an example of a user equipment (UE) in the embodiments, a user equipment is not limited thereto. The embodiments are also applicable to other types of user equipments such as personal digital assistants (PDAs). Hereinafter, "user equipment" will be also abbreviated as "UE", for ease of explanation. Further, "base transceiver station" will be also abbreviated as "BTS", for ease of explanation.

Figure 1:
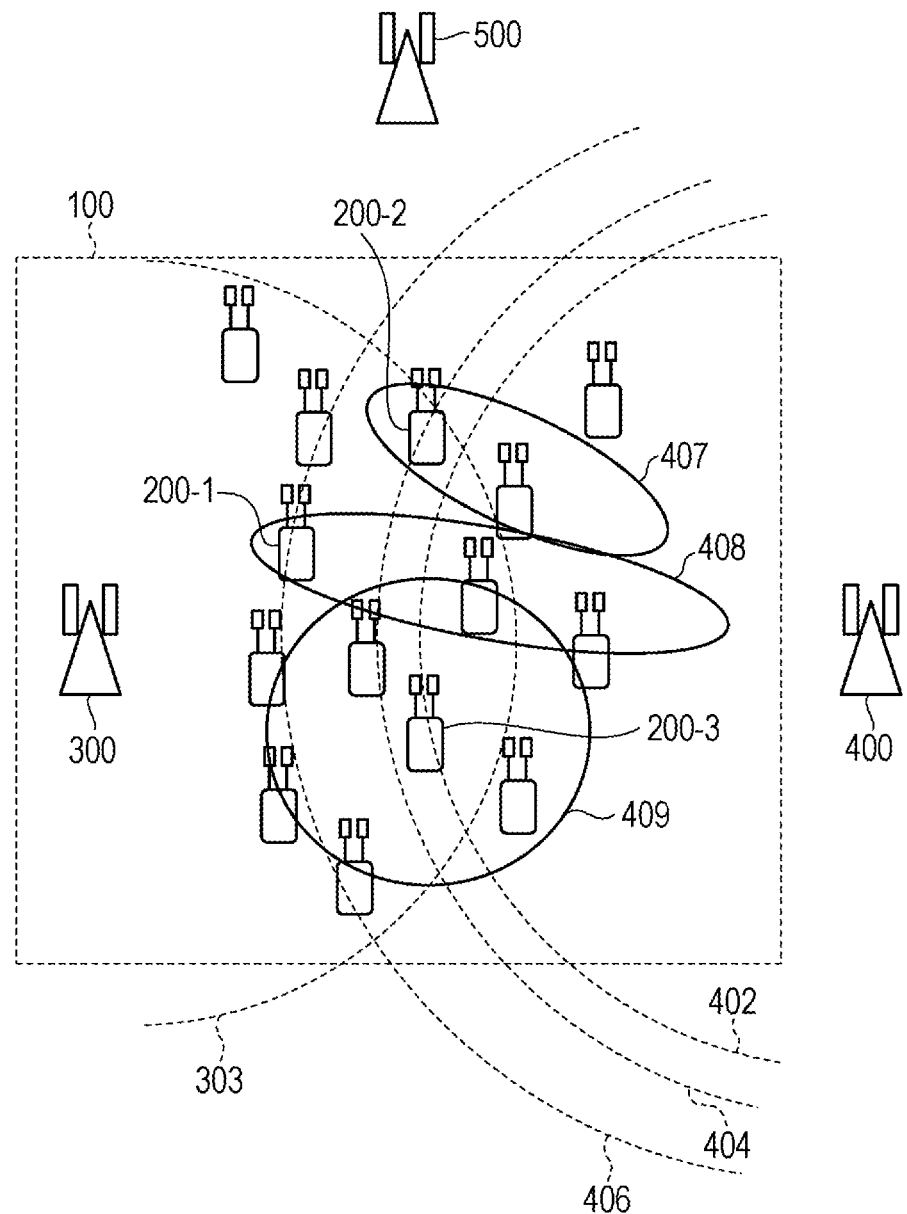
FIG. 1 is a diagram illustrating a configuration example of a wireless communication system, according to a first embodiment.

FIG. 1 is a diagram illustrating a configuration example of a wireless communication system, according to a first embodiment. As depicted in FIG. 1, a wireless communication system 100 includes a plurality of user equipments including, for example, UEs 200-1, 200-2, and 200-3, and a base transceiver station (BTS) 300. Each of the plurality of user equipments (including the UEs 200-1, 200-2, and 200-3) is a terminal device having a wireless communication function, such as a mobile phone. Hereafter, the plurality of user equipments including UEs 200-1, 200-2, and 200-3 may be also referred to collectively as "UE 200" for the sake of convenience.

In FIG. 1, a dotted line 303 represents an edge of the communication range of the BTS 300. In other words, the BTS 300 communicates with user equipments located between the dotted line 303 and the BTS 300. Since all of the UEs 200-1, 200-2, and 200-3 are located between the dotted line 303 and the BTS 300, the BTS 300 is able to communicate with them. In this embodiment, it is assumed that a communication load imposed on the BTS 300 is larger than that imposed on the BTS 400. Further, it is also assumed that, in order to level communication loads imposed on the BTSs 300 and 400, one of UEs 200-1, 200-2, and 200-3 is handed over to the BTS 400.

For example, a BTS management apparatus 500, which manages the BTSs 300 and 400, receives signals indicating the respective communication loads imposed on the BTSs 300 and 400 from the respective BTSs 300 and 400. When the imbalance in communication load between the BTSs 300 and 400 exceeds a predetermined threshold, the BTS management apparatus 500 transmits an instruction requesting the leveling of the communication loads to the BTS having the larger communication load (in this case, the BTS 300). Upon receiving the instruction from the BTS management apparatus 500, the BTS 300 hands over one of the UEs 200-1, 200-2, and 200-3 to the BTS 400. The configuration of the BTS 300 and the process performed thereby will be described in detail later.

In FIG. 1, a dotted line 402 is a line that links locations having the same radio wave strength as the reception power value of a radio signal that the UE 200-3 receives from the BTS 400 without performing reception beam formation in which a radio signal transmitted from a particular direction is selectively received with increased reception sensitivity. Similarly, a dotted line 404 is a line that links locations having the same radio wave strength as the reception power value of a radio signal that the UE 200-2 receives from the BTS 400 without performing reception beam formation. Similarly, a dotted line 406 is a line that links locations having the same radio wave strength as the reception power value of a radio signal that the UE 200-1 receives from the BTS 400 without performing reception beam formation.

In this embodiment, it is also assumed that the UEs 200-1 and 200-2 have the reception beam formation functions and the UE 200-3 does not have the reception beam formation function. Here, the reception beam formation function refers to the function of selectively receiving, with high sensitivity, a radio signal transmitted from a particular direction.

In recent years, the antenna of user equipment has been miniaturized, allowing even small devices such as mobile phones to incorporate many antennas. A user equipment may be configured to incorporate a gravity sensor, a magnetic sensor, a global positioning system (GPS), or the like, so as to easily acquire information on the posture or orientation thereof. This allows a user equipment to implement a technique utilizing a physical directivity, such as a beam formation technique.

In FIG. 1, ellipses 407 and 408 schematically represent that the UEs 200-1 and 200-2, respectively, can receive a radio signal from the BTS 400 with high sensitivity using the reception beam formation functions. Further, in FIG. 1, a circle 409 schematically represents that the UE 200-3 does not have reception directivity implemented by a reception beam formation function.

Figure 2:
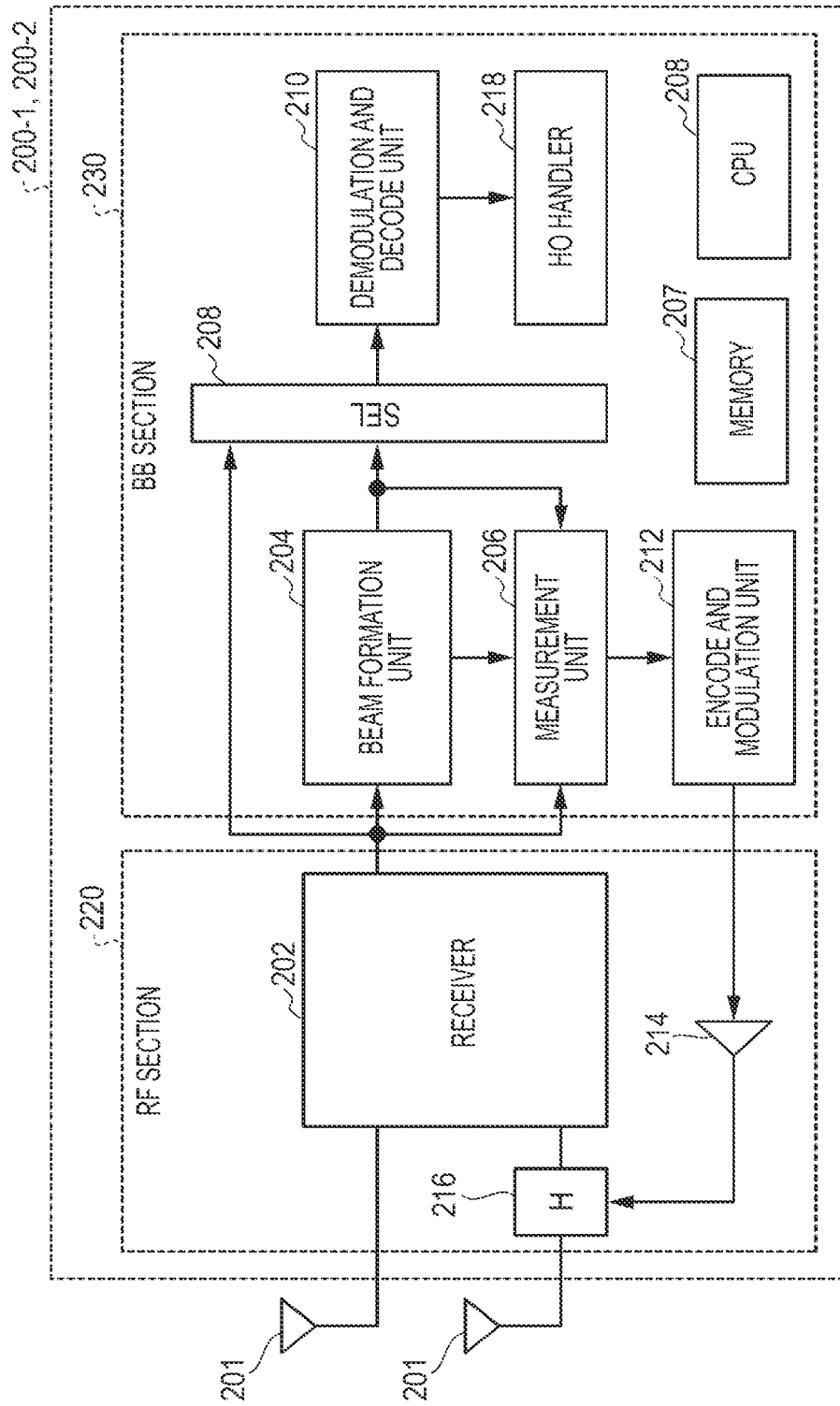
FIG. 2 is a diagram illustrating a configuration example of a user equipment having a reception beam formation function, according to an embodiment.

FIG. 2 is a diagram illustrating a configuration example of a user equipment having a reception beam formation function, according to an embodiment. As depicted in FIG. 2, UEs 200-1 and 200-2 each include a receiver 202, a beam formation unit 204, a measurement unit 206, a selector (SEL) 208, a demodulation and decode unit 210, an encode and modulation unit 212, a memory 207, and a central processing unit (CPU) 208. The UEs 200-1 and 200-2 also each have an amplifier 214, a hybrid circuit (H) 216, and an HO handler 218. The receiver 202, the amplifier 214, and the hybrid circuit 216 are included in a radio frequency (RF) section 220 and implemented by, for example, using an analog circuit. The beam formation unit 204, the measurement unit 206, the SEL 208, the demodulation and decode unit 210, the encode and modulation unit 212, and the HO handler 218 are included in a base band (BB) section 230 and implemented by, for example, using a processor such as a CPU or a digital signal processor (DSP). In FIG. 2, a CPU 208 is depicted as a typical processor. Hereinafter, the description will be given of UE 200-1 as a typical example of a user equipment having a reception beam formation function. UE 200-2 has the same configuration as US 200-1, and the description thereof is omitted here.

The receiver 202 of UE 200-1 receives, from the BTS 300 via the antenna 201, an instruction signal requesting UE 200-1 to transmit to the BTS 300 a signal indicating the presence or absence of a reception beam formation function, that is, a signal indicating whether UE 200-1 has a reception beam formation function or not. The receiver 202 of UE 200-1 further receives, from the BTS 300 via the antenna, an instruction signal requesting UE 200-1 to measure first and second reception power values and to transmit the measured first and second reception power values to the BTS 300. Here, the first reception power value refers to a reception power value at which UE 200-1 receives a radio signal from the BTS 400 without performing reception beam formation. The second reception power value refers to the reception power value at which UE 200-1 receives a radio signal from the BTS 400 by performing reception beam formation.

The receiver 202 of UE 200-1 receives a radio signal also from the BTS 400 via the antenna 201, and outputs the radio signal received from the BTS 400 to the beam formation unit 204, the measurement unit 206, and the SEL 208. While UE 200-1 is provided with two antennas 201 in the example of FIG. 2, the number of antennas 201 is not limited to two.

The beam formation unit 204 performs reception beam formation on the radio signal received by the receiver 202. The measurement unit 206 measures first and second reception power values, where the first reception power value is a reception power value at which UE 200-1 receives a radio signal from BTS 400 without using the reception beam formation function, and the second reception power value is a reception power value at which UE 200-1 receives a radio signal from BTS 400 using the reception beam formation function. For example, the measurement unit 206 measures a reception power value of the radio signal outputted from the receiver 202 and defines the measured reception power value as a first reception power value. The measurement unit 206 also measures a reception power value of the radio signal outputted from the beam formation unit 204 and defines the measured reception power value as a second reception power value.

The SEL 208 selects one of a radio signal outputted from the receiver 202 and a radio signal outputted from the beam formation unit 204, and outputs the selected radio signal to the demodulation and decode unit 210. In other words, the SEL 208 selects one of a radio signal received without performing reception beam formation and a radio signal received by performing reception beam formation, and outputs the selected radio signal to the demodulation and decode unit 210. The demodulation and decode unit 210 demodulates and decodes the radio signal selected by the SEL 208, and outputs the resulting radio signal to the HO handler 218.

The encode and modulation unit 212 encodes and modulates the signals indicating the first and second reception power values measured by the measurement unit 206. The amplifier 214 amplifies the signals indicating the first and second reception power values that are encoded and modulated by the encode and modulation unit 212.

The hybrid circuit 216 switches a mode between a reception mode in which radio signals received via the antenna 201 are outputted to the receiver 202, and a transmission mode in which signals are sent via the antenna 201. For example, in the transmission mode, the hybrid circuit 216 transmits, to the BTS 300 via the antenna 201, the signals, indicating the first and second reception power values, amplified by the amplifier 214, as well as a signal indicating the presence or absence of the reception beam function of UE 200-1.

When the radio signal that has been demodulated and decoded by the demodulation and decode unit 210 contains a control signal indicating that UE 200-1 has been selected as a user equipment to be handed over, the HO handler 218 performs handover processing that changes an accessible BTS with which UE 200-1 communicates, from the BTS 300 to the BTS 400. The HO handler 218 performs, for example, a process of changing, in the memory 207 of UE 200-1, information identifying an accessible BTS from information identifying the BTS 300 to information identifying the BTS 400.

Figure 3:
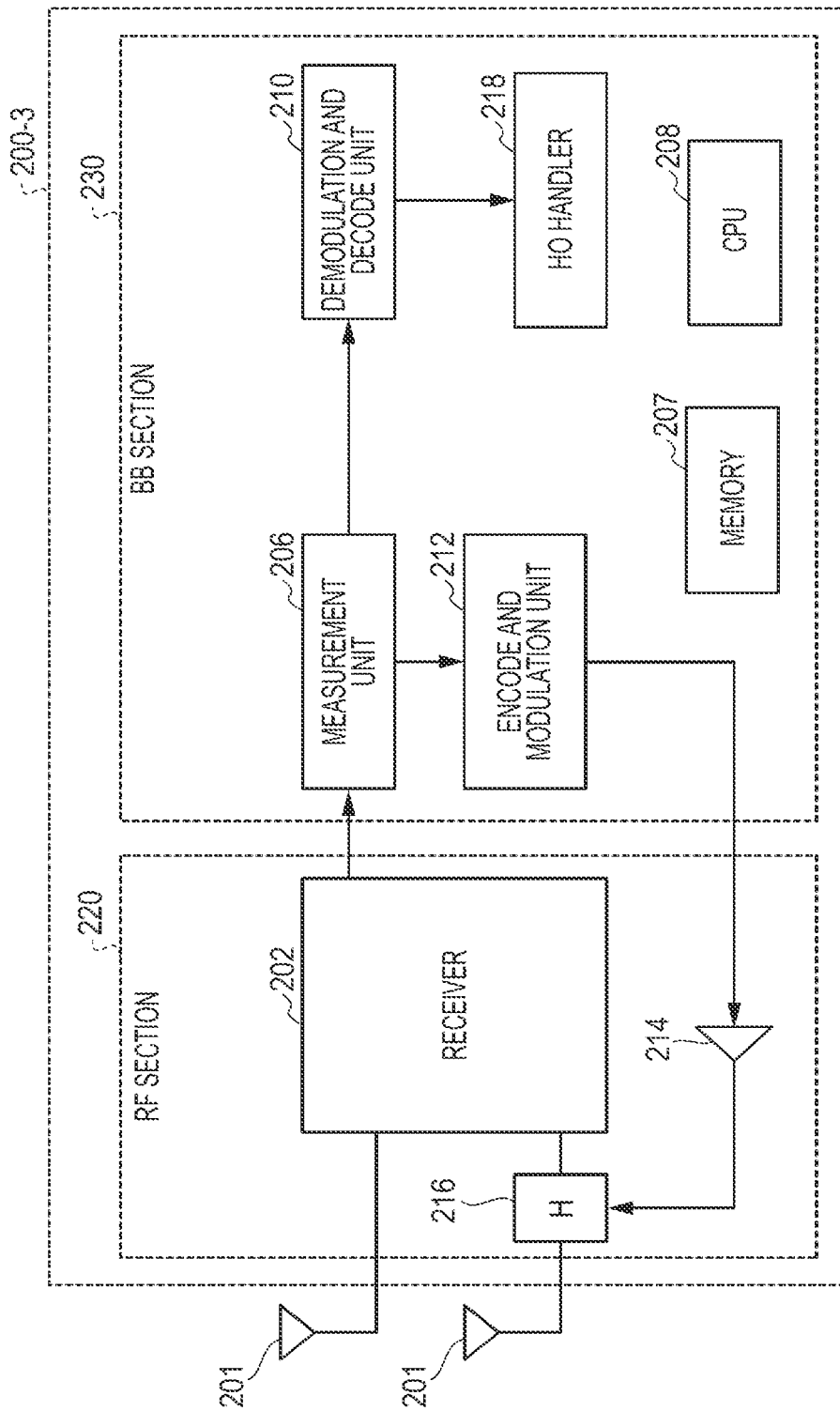
FIG. 3 is a diagram illustrating a configuration example of user equipment not having a reception beam formation function, according to an embodiment.

FIG. 3 is a diagram illustrating a configuration example of user equipment not having a reception beam formation function, according to an embodiment. As depicted in FIG. 3, UE 200-3 differs from UE 200-1 (or UE 200-2) of FIG. 2 in that UE 200-3 includes neither beam formation unit 204 nor SEL 208. The difference between UE 200-3 and UE 200-1 (or UE 200-2) will be mainly described and the same components as those of FIG. 2 will not be described here.

The receiver 202 of UE 200-3 receives a radio signal from the BTS 400 and outputs the received radio signal to the measurement unit 206. The measurement unit 206 measures a first reception power value that is a reception power value at which UE 200-3 receives a radio signal from BTS 400 without performing reception beam formation. For example, the measurement unit 206 measures a reception power value of a radio signal outputted from the receiver 202 and defines the measured reception power value as the first reception power value. The demodulation and decode unit 210 demodulates and decodes the radio signal outputted from the measurement unit 206.

Encode and modulation unit 212 encodes and modulates the signal indicating the first reception power value measured by the measurement unit 206 The amplifier 214 amplifies the signal indicating the first reception power value that has been encoded and modulated by the encode and modulation unit 212. The hybrid circuit 216 switches a mode between a reception mode in which radio signals received via the antenna 201 are outputted to the receiver 202, and a transmission mode in which signals are sent to the antenna 201. For example, in the transmission mode, hybrid circuit 216 transmits, to the BTS 300 via the antenna 201, a signal indicating the first reception power value amplified by the amplifier 214, as well as a signal indicating the absence of the reception beam formation function, that is, a signal indication that UE 200-3 does not have the reception beam formation function.

In UE 200-3, measurement unit 206, demodulation and decode unit 210, encode and modulation unit 212, and HO handler 218 are included in BB section 230 and may be implemented by, for example, using memory 207 and CPU 208. Here, it is also possible to use a digital signal processor (DSP) instead of CPU 208.

Figure 4:
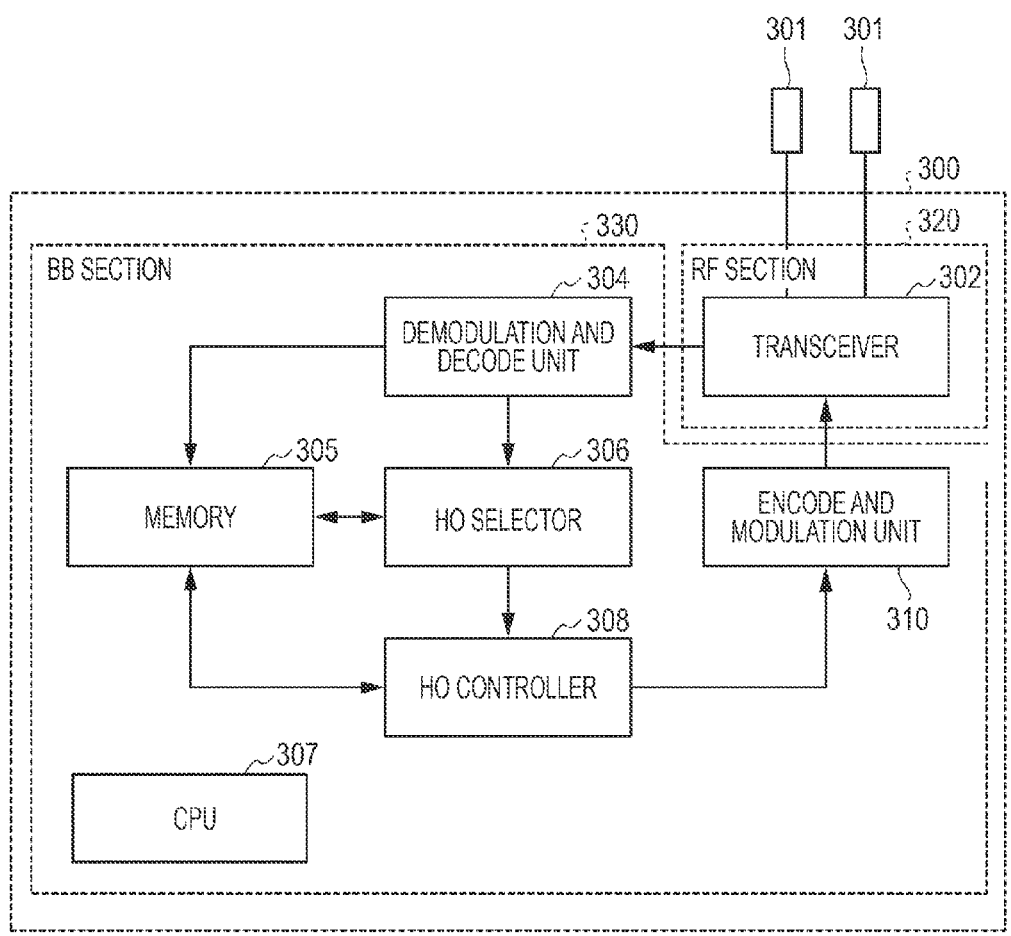
FIG. 4 is a diagram illustrating a configuration example of a base transceiver station, according to an embodiment.

FIG. 4 is a diagram illustrating a configuration example of a base transceiver station, according to an embodiment. As depicted in FIG. 4, the BTS 300 may be configured to include a transceiver 302, a demodulation and decode unit 304, a memory 305, an HO selector 306, a CPU 307, an HO controller 308, and an encode and modulation unit 310. The BTS 400 has the same configuration as the BTS 300. The transceiver 302 is included in an RF section 320 and implemented by, for example, using an analog circuit. The demodulation and decode unit 304, the memory 305, the HO selector 306, the HO controller 308, and the encode and modulation unit 310 are included in a BB section 330 and implemented by, for example, using a processor such as a CPU or a DSP. In FIG. 4, a CPU 307 is depicted as a typical processor.

The transceiver 302 transmits, to each of UEs 200-1, 200-2, and 200-3 via an antenna 301, an instruction signal that requests each user equipment to transmit, to the BTS 300, a signal indicating the presence or absence of a reception beam formation function, that is, a signal indication whether the each user equipment has a reception beam formation function or not. The transceiver 302 also transmits, to each of UEs 200-1, 200-2, and 200-3 via the antenna 301, an instruction signal that requests each user equipment to measure first and second reception power values and to transmit the measured first and second reception power values to the BTS 300.

The transceiver 302 also receives, from each of UEs 200-1, 200-2, and 200-3 via the antenna 301, a signal indicating the presence or absence of a reception beam formation function, and signals indicating the first and second reception power values. In the example of FIG. 4, the BTS 300 is provided with two antennas 301. However, the number of antennas 301 is not limited to two. In the example of FIG. 4, it is assumed that the instruction signals are transmitted to three user equipments UEs 200-1, 200-2, and 200-3 for the sake of convenience. However, user equipments to which the instruction signals are transmitted are not limited thereto. The instruction signals may be transmitted to any number of user equipments belonging to the BTS 300.

The demodulation and decode unit 304 demodulates and decodes the signals, received by the transceiver 302, indicating the presence or absence of a reception beam formation function for each of UEs 200-1, 200-2, and 200-3. The demodulation and decode unit 304 also demodulates and decodes the signals, received by the transceiver 302, indicating the first and second reception power values of each of UEs 200-1, 200-2, and 200-3, so as to obtain the first and second reception power values of UEs 200-1, 200-2, and 200-3.

The memory 305 stores the signal, demodulated and decoded by the demodulation and decode unit 304, indicating the presence or absence of a reception beam formation function for each of UEs 200-1, 200-2, and 200-3. The memory 305 also stores the signals, demodulated and decoded by the demodulation and decode unit 304, indicating first and second reception power values of each of UEs 200-1, 200-2, and 200-3.

The HO selector 306 selects a user equipment to be handed over, based on the first and second reception power values of UEs 200-1, 200-2, and 200-3 that have been obtained via the demodulation and decode unit 304. For example, the HO selector 306 selects a user equipment to be handed over from BTS 300 to BTS 400, from among the UEs 200-1, 200-2, and 200-3. Here, the HO selector 306 may select a user equipment to be handed over to the BTS 400, based on the first and second reception power values stored in the memory 305 or based on the first and second reception power values outputted from the demodulation and decode unit 304.

The HO controller 308 performs handover processing on the user equipment selected by the HO selector 306. For example, the HO controller 308 generates a control signal for requesting a user equipment selected by the HO selector 306 to change an accessible BTS with which the user equipment is communicating, from BTS 300 to BTS 400.

The encode and modulation unit 310 encodes and modulates the control signal generated by the HO controller 308. The transceiver 302 transmits the control signal that has been encoded and modulated by the encode and modulation unit 310, to the user equipment selected by the HO selector 306 via the antenna 301.

Figure 5:
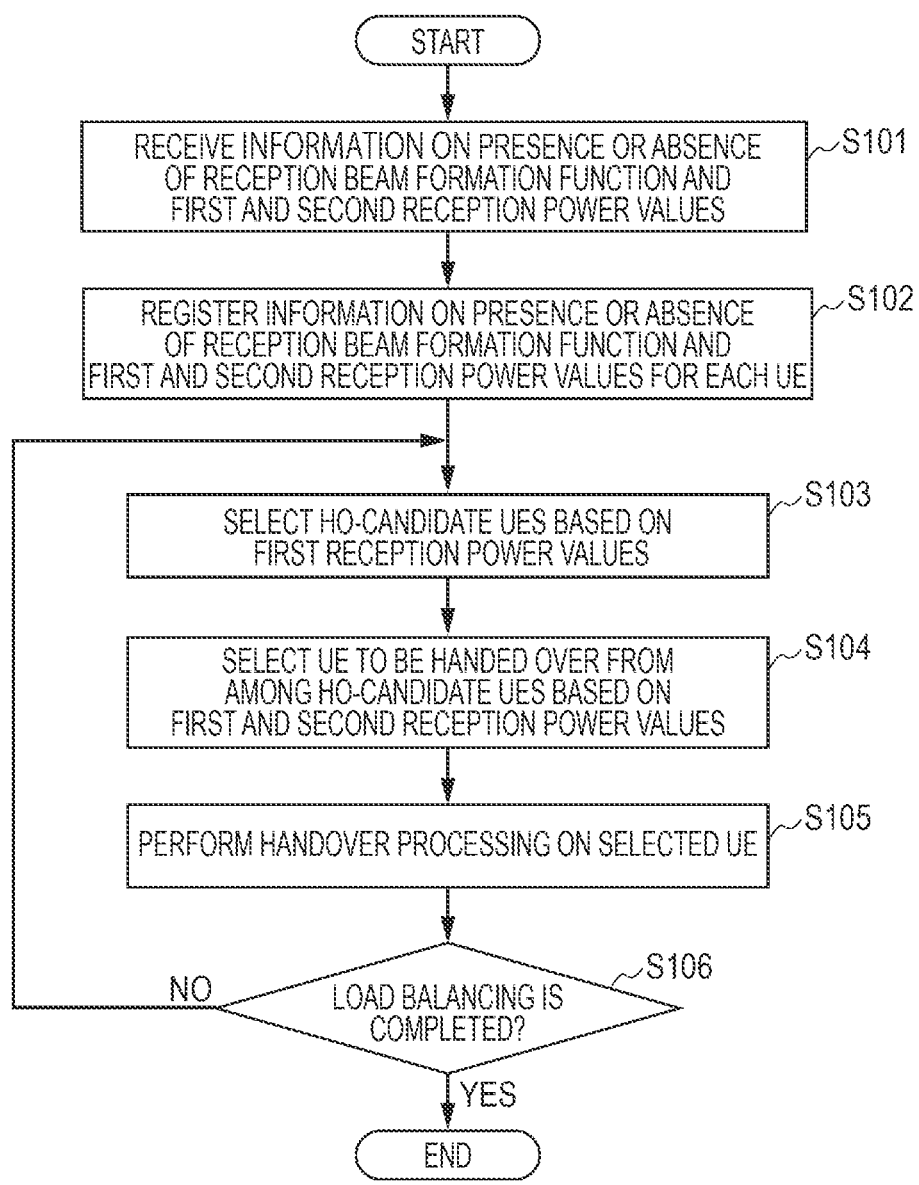
FIG. 5 is a diagram illustrating an example of an operational flowchart performed by a base transceiver station, according to a first embodiment.

FIG. 5 is a diagram illustrating an example of an operational flowchart performed by a base transceiver station, according to a first embodiment. In FIG. 5, description will be given of BTS 300 as a typical base transceiver station with reference to FIG. 6.

Figure 6:
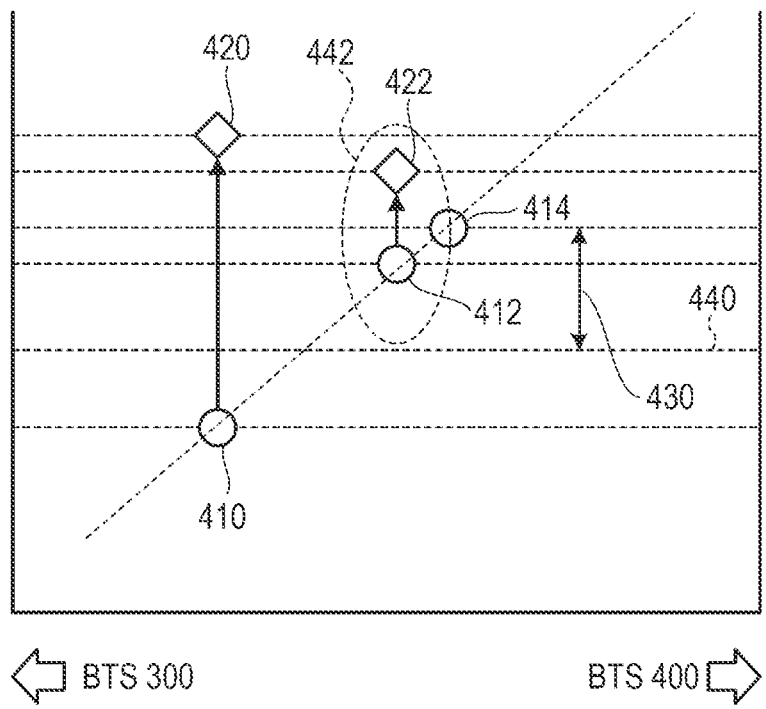
FIG. 6 is a schematic diagram illustrating an example of reception power values used for selecting a user equipment to be handed over, according to a first embodiment.

FIG. 6 is a schematic diagram illustrating an example of reception power values used for selecting a user equipment to be handed over, according to a first embodiment. In the graph of FIG. 6, a horizontal axis indicates a physical distance from BTS 300 and BTS 400 to a point on the graph in such a manner that the distance from BTS 300 to the point becomes shorter when the point moves leftward, and the distance from BTS 400 to the point becomes shorter when the point moves rightward. In the graph of FIG. 6, a vertical axis represents a reception power value (the strength of a reception radio wave) at which each of UEs 200-1, 200-2, and 200-3 receives a radio signal from BTS 400.

In FIG. 6, a circle 410 represents a first reception power value at which the UE 200-1 receives a radio signal from BTS 400 without performing reception beam formation. A circle 412 represents a first reception power value at which UE 200-2 receives a radio signal from BTS 400 without performing a reception beam formation. A circle 414 represents a first reception power value at which UE 200-3 receives a radio signal from BTS 400 without performing a reception beam formation. As denoted by circles 410, 412, and 414, first reception power values measured without performing reception beam formations are inversely proportional to the physical distance from the BTS 400, that is, a first reception power value becomes larger as the distance from the BTS 400 becomes shorter. A rhombus 420 represents a second reception power value at which UE 200-1 receives a radio signal from BTS 400 by performing reception beam formation. A rhombus 422 represents a second reception power value at which UE 200-2 receives a radio signal from BTS 400 by performing reception beam formation.

Referring back to FIG. 5, in operation S101, the transceiver 302 of BTS 300 first receives, from each of UEs 200-1, 200-2, and 200-3, a signal indicating the presence or absence of a reception beam formation function and signals indicating the first and second reception power values of the each user equipment.

In operation S102, the demodulation and decode unit 304 of BTS 300 registers, for each user equipment, information on the presence or absence of a reception beam formation function and the first and second reception power values, in the memory 305.

In operation S103, the HO selector 306 of BTS 300 selects, from among a plurality of user equipments, for example, UEs 200-1, 200-2, and 200-3, one or more user equipments each being a candidate for undergoing handover processing (hereinafter, abbreviated as "a HO-candidate user equipment"), based on the first reception power values of the plurality of user equipments (UEs 200-1, 200-2, and 200-3). For example, the HO selector 306 selects, as a HO-candidate user equipment, a user equipment having the largest first reception power value among UEs 200-1, 200-2, and 200-3. In this case, as depicted in FIG. 6, UE 200-3 that has the largest first reception power value among UEs 200-1, 200-2, and 200-3 as denoted by circle 414, is selected as a HO-candidate user equipment. The HO selector 306 also selects, as a HO-candidate user equipment, user equipments having first reception power values falling within a range 430, where the range 430 is beforehand defined as a set of first reception power values whose differences from the first reception power value of UE 200-3 (denoted by circle 414) are within a predetermined value.

In this case, since the first reception power value of UE 200-2 (denoted by circle 412) falls within the range 430 as depicted in FIG. 6, the UE 200-2 is also selected as a HO-candidate user equipment. On the other hand, UE 200-1 is not selected as a HO-candidate user equipment because the first reception power value thereof (denoted by circle 410) does not fall within the range 430.

In the example mentioned above, a user equipment whose first reception power value falls within the range 430 is selected as a HO-candidate user equipment. However, the embodiment is not limited to this. For example, the HO selector 306 may be configured to preset a threshold 440 as an absolute value as depicted in FIG. 6, and to select, as a HO-candidate user equipment, a user equipment having a first reception power value larger than the preset threshold 440. Further, the threshold 440 may be set so as to be changed, for example, by an operation of the administrator of BTS 300. In the first embodiment, for example, UEs 200-2 and 200-3 that are approximately the same distance away from the HO-source BTS (the BTS from which handover is performed) are determined to cause approximately the same degree of interference when handover is performed, and both the UEs 200-2 and 200-3 are selected as HO-candidate user equipments.

Referring back to FIG. 5, in operation S104, the HO selector 306 selects a user equipment to be handed over, from among the selected one or more HO-candidate user equipments, based on the first and second reception power values. Here, there are three cases for selecting a user equipment to be handed over from the selected one or more HO-candidate user equipments, as described below.

In the first case where the selected one or more HO-candidate user equipments each have a reception beam formation function, HO selector 306 selects, from among the selected one or more HO-candidate user equipments, a user equipment having the largest second reception power value, as a user equipment to be handed over.

In the second case where the selected one or more HO-candidate user equipments each do not have a reception beam formation function, HO selector 306 selects, from among the selected one or more HO-candidate user equipments, a user equipment having the largest first reception power value, as a user equipment to be handed over.

In the third case where the one or more HO-candidate user equipments include both at least one user equipment having a reception beam formation function and at least one user equipment not having the reception beam formation function, HO selector 306 selects, from among the selected one or more HO-candidate user equipments, a user equipment having a reception power value that is largest among the first and second reception power values received from the selected one or more HO-candidate user equipments, as a user equipment to be handed over.

In the first embodiment, for example as depicted in FIG. 6, the selected one or more HO-candidate user equipments include UE 200-2 having a reception beam formation function and UE 200-3 not having a reception beam formation function. In this case, the HO selector 306 selects, as a HO-candidate user equipment, a user equipment having a reception power value that is largest among the first and second reception power values of the selected one or more HO-candidate user equipments, for example, UEs 200-2 and 200-3. In this case, since the second reception power value of UE 200-2 (denoted by the rhombus 422 in FIG. 6) is larger than the first reception power value of UE 200-3 (denoted by the circle 414 in FIG. 6), the HO selector 306 selects UE 200-2 as a HO-candidate user equipment. In FIG. 6, a dotted ellipse 442 enclosing the reception power values of UE 200-2 schematically illustrates that the UE 200-2 is selected as a HO-candidate user equipment.

Thus, in the first embodiment, UE 200-2 that has a high reception capability and has a large reception power when performing reception beam formation is selected, from among the one or more HO-candidate user equipments, as a user equipment to be handed over. Thus, according to the first embodiment, a user equipment capable of performing wireless communication with the HO-destination BTS (the BTS to which handover is performed) at a high throughput may be selected without reducing the wireless communication throughput of the HO-source BTS from which the handover is performed.

Referring back to FIG. 5, in operation S105, the HO controller 308 performs the handover processing on UE 200-2 that was selected as a user equipment to be handed over. For example, the HO controller 308 generates a control signal requesting the change of an accessible BTS from BTS 300 to BTS 400, and the transceiver 302 transmits the generated control signal to the user equipment to be handed, for example, to UE 200-2.

In operation S106, the HO controller 308 determines whether load balancing is completed or not. For example, the HO controller 308 determines whether load balancing is completed or not by determining whether the communication load imposed on BTS 300 has fallen below a predetermined threshold value. When HO controller 308 determines that the load balancing is not completed (NO in operation S106), the processing returns to operation S103. Meanwhile, when the HO controller 308 has determined that load balancing is completed (YES in operation S106), the processing is ended.

As described above, according to the first embodiment, it is possible to suppress increase in interferences between radio signals transmitted between the BTSs and the user equipments. Further, wireless communication may be performed favorably between the user equipment on which the handover has been performed and the HO-destination BTS to which the handover has been performed. For example, according to the first embodiment, a user equipment having a large first reception power value, that is, a user equipment close to the HO-destination BTS is selected as a HO-candidate user equipment. Accordingly, at the periphery of the user equipment selected as a HO-candidate user equipment, the number of user equipments belonging to the HO-source BTS is relatively small.

Further, since a user equipment selected as a HO-candidate user equipment is close to the HO-destination BTS, the user equipment is capable of transmitting a radio signal to the HO-destination BTS using relatively small transmission power. Thus, according to the first embodiment, after the handover has been performed, increase in interferences between radio signals handled by the handed-over user equipment and radio signals handled by the other user equipments belonging to the HO-source BTS may be suppressed.

Further, according to the first embodiment, a user equipment having a reception power value that is largest among the first and second reception power values received from the one or more HO-candidate user equipments, is selected as a user equipment to be handed over. That is, a user equipment that receives a radio signal with the largest reception power value from the HO-destination BTS is selected as a user equipment to be handed over. Thus, according to the first embodiment, the handed-over UE and the HO-destination BTS can favorably perform wireless communication with each other.

Further, according to the first embodiment, the communication capacity of the HO-source BTS may be increased by performing handover processing to level the communication loads imposed on multiple BTSs. Meanwhile, nowadays wireless communication systems are shifting from 3G (CDMA: code division multiple access) systems to 4G (OFDMA: orthogonal frequency division multiple access) systems. In a 4G system, increase in interferences, caused by the handover processing, between radio signals transmitted between BTSs and user equipments is more remarkable. Therefore, it is more preferable to apply the first embodiment to the 4G system.

Second Embodiment

Figure 7:
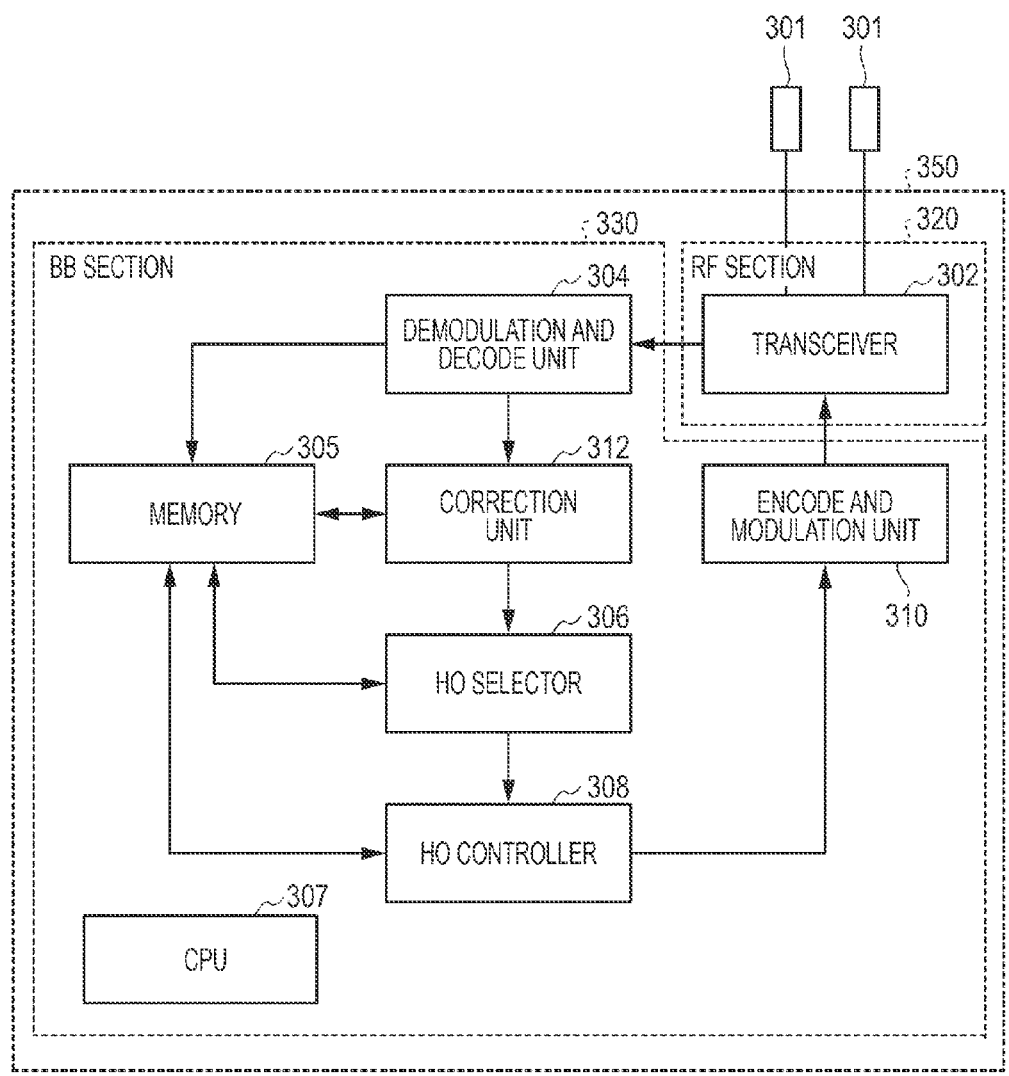
FIG. 7 is a diagram illustrating a configuration example of a base transceiver station, according to a second embodiment.

FIG. 7 is a diagram illustrating a configuration example of a base transceiver station, according to a second embodiment. As depicted in FIG. 7, a BTS 350 according to the second embodiment differs from the BTS 300 according to the first embodiment in that the BTS 350 additionally includes a correction unit 312. Accordingly, the difference between the BTS 350 and the BTS 300 will be mainly described, and the same components as those of the BTS 300 will be omitted here.

In the following example of the second embodiment, it is assumed that, out of UEs 200-1, 200-2, and 200-3, the UE 200-1 has the transmission beam formation function that allows UE 200-1 to selectively transmit a radio signal in a particular direction with increased strength. A transceiver 302 is included in an RF section 320 and implemented by, for example, using an analog circuit. A demodulation and decode unit 304, a memory 305, an HO selector 306, a CPU 307, an HO controller 308, an encode and modulation unit 310, and a correction unit 312 are included in a BB section 330, and implemented by, for example, using a processor such as a CPU or a DSP. In FIG. 7, the CPU 307 is depicted as a typical processor.

The transceiver 302 according to the second embodiment, in addition to the configuration of transceiver 302 according to the first embodiment, further transmits, to each of UEs 200-1, 200-2, and 200-3 via an antenna 301, an instruction signal that requests the each user equipment to transmit, to the BTS 350, a signal indicating the presence or absence of a transmission beam formation function of the each user equipment. When a user equipment included in the UEs 200-1, 200-2, and 200-3 has the transmission beam formation function, the transceiver 302 of BTS 350 transmits, to the user equipment via the antenna 301, an instruction signal that requests the user equipment to transmit, to the BTS 350, a signal indicating the capability of the transmission beam formation function provided for the user equipment.

When a user equipment included in the UEs 200-1, 200-2, and 200-3 has the transmission beam formation function, the correction unit 312 generates a third reception power value by correcting the first reception power value of the user equipment in accordance with the capability of the transmission beam formation function provided for the user equipment. For example, since it is assumed that the UE 200-1 has the transmission beam formation function, the correction unit 312 corrects the first reception power value of the UE 200-1 in accordance with the capability of the transmission beam formation function provided for the UE 200-1 so as to generate a third reception power value. The correction unit 312 may correct the first reception power value of the UE 200-1 using capability information outputted from the demodulation and decode unit 304 or using the capability information stored in the memory 305, where the capability information indicates the capability of the transmission beam formation function provided for the UE 200-1.

In the above example of the second embodiment, the first reception power value is corrected using capability information transmitted from a user equipment having a transmission beam formation function, where the capability information indicates the capability of the transmission beam formation function provided for the user equipment. However, the embodiment is not limited to this. For example, the capability of the transmission beam formation function provided for a user equipment is often correlated to the capability of the reception beam formation function provided for the user equipment. Accordingly, correction unit 312 may estimate the capability of the transmission beam formation function provided for a user equipment from the capability of the reception beam formation function provided for the user equipment, and the correction unit 312 may correct the first reception power value using the estimated capability of the transmission beam formation function.

The HO selector 306 selects one or more HO-candidate user equipments based on the third reception power values (the corrected first reception power values) of user equipments each having a transmission beam formation function and the first reception power values of user equipments each not having a transmission beam formation function. For example, the HO selector 306 selects one or more HO-candidate user equipments based on the third reception power value of the UE 200-1 that was obtained by the correction unit 312 and the first reception power values of the UEs 200-2 and 200-3. The HO selector 306 then selects a user equipment to be handed over, from among the selected one or more HO-candidate user equipments, based on the third reception power values (the corrected first reception power values), the first reception power values, and the second reception power values. Here, the HO selector 306 may select a user equipment to be handed over, using the third reception power values outputted from the correction unit 312, the first reception power values outputted from the demodulation and decode unit 304, and the second reception power values outputted from the demodulation and decode unit 304. It is also possible for the HO selector 306 to select a user equipment to be handed over using the third reception power values stored in the memory 305, the first reception power values stored in the memory 305, and the second reception power values stored in the memory 305. The HO selector 306 will be described in detail later.

Figure 8:
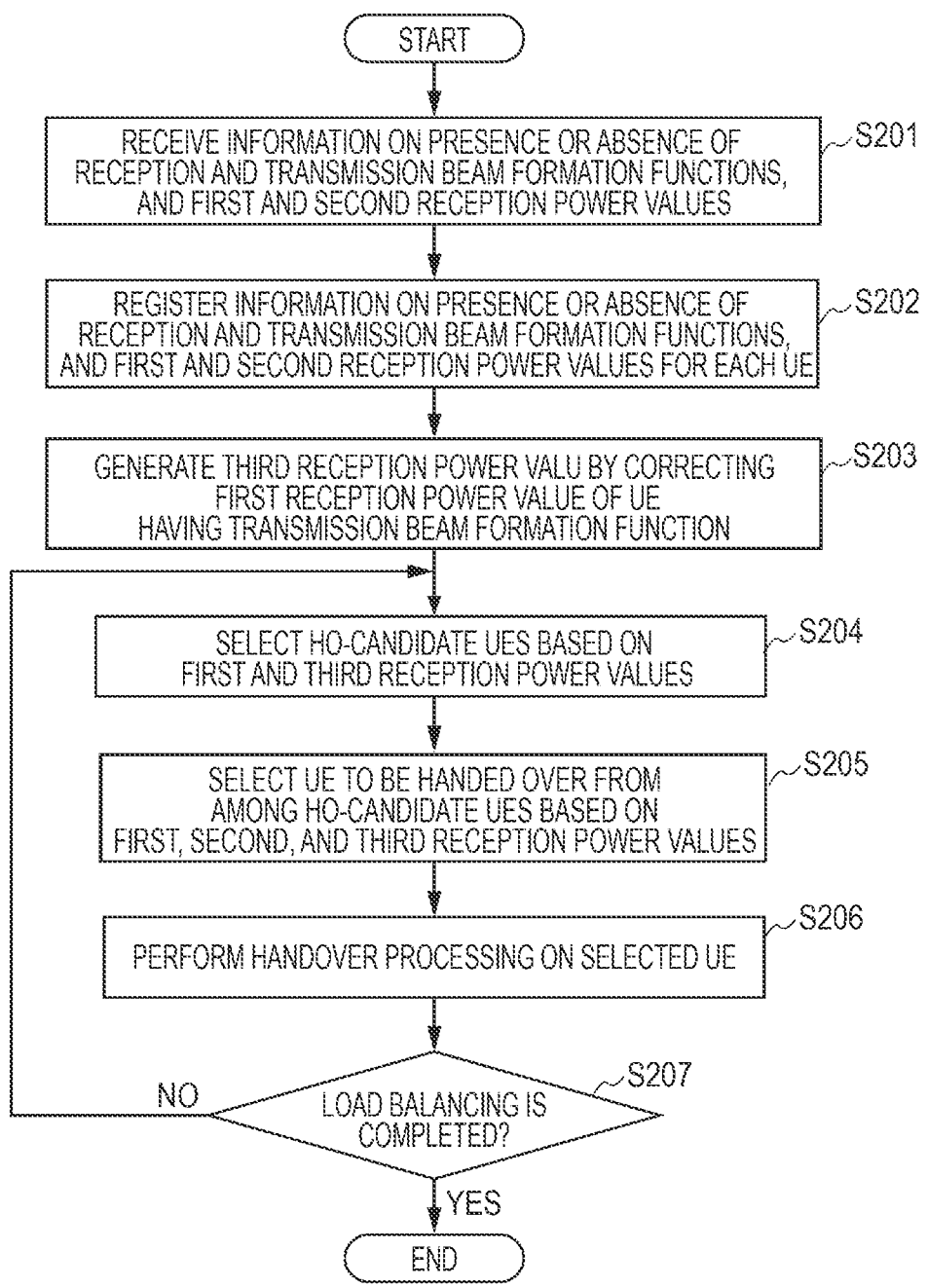
FIG. 8 is a diagram illustrating an example of an operational flowchart performed by a base transceiver station, according to a second embodiment.

FIG. 8 is a diagram illustrating an example of an operational flowchart performed by a base transceiver station, according to a second embodiment. In FIG. 8, description will be given of BTS 350 as a typical base transceiver station with reference to FIG. 9.

Figure 9:
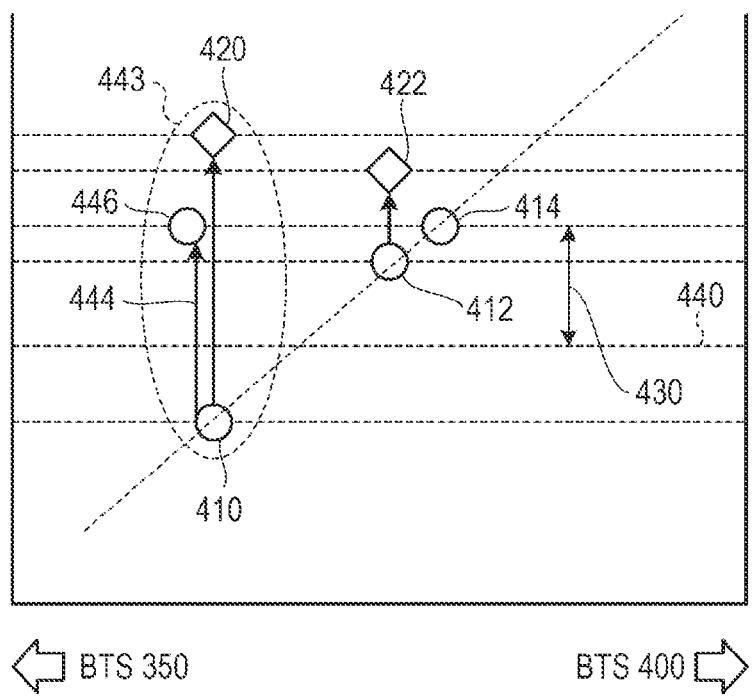
FIG. 9 is a schematic diagram illustrating an example of reception power values used for selecting a user equipment to be handed over, according to a second embodiment.

FIG. 9 is a schematic diagram illustrating an example of reception power values used for selecting a user equipment to be handed over, according to a second embodiment. In the graph of FIG. 9, a horizontal axis indicates a physical distance from BTS 350 and BTS 400 to a point on the graph in such a manner that the distance from BTS 350 to the point becomes shorter when the point moves leftward, and the distance from BTS 400 to the point becomes shorter when the point moves rightward. In the graph of FIG. 9, a vertical axis represents a reception power value (the strength of a reception radio waver) at which each of UEs 200-1, 200-2, and 200-3 receives a radio signal from BTS 400.

In FIG. 9, a circle 410 represents a first reception power value at which the UE 200-1 receives a radio signal from BTS 400 without performing reception beam formation. A circle 412 represents a first reception power value at which the UE 200-2 receives a radio signal from BTS 400 without performing reception beam formation. A circle 414 represents a first reception power value at which the UE 200-3 receives a radio signal from BTS 400 without performing reception beam formation. As denoted by the circles 410, 412, and 414, the first reception power values measured without performing the reception beam formation are inversely proportional to the physical distance from the BTS 400, that is, the first reception power value becomes larger as the distance from the BTS 400 becomes shorter.

A rhombus 420 represents a second reception power value at which the UE 200-1 receives a radio signal from BTS 400 by performing reception beam formation. A rhombus 422 represents a second reception power value at which the UE 200-2 receives a radio signal from BTS 400 by performing reception beam formation. In the second embodiment, correction unit 312 generates a third reception power value by correcting the first reception power value received from a user equipment having a transmission beam formation function. For example, since UE 200-1 has a transmission beam formation function in this case, the first reception power value received from UE 200-1 is corrected by the correction unit 312 so that the third reception power value is generated. In FIG. 9, an arrow 444 represents the difference between the third reception power value (the corrected first reception power value) and the uncorrected first reception value of UE 200-1. A circle 446 represents the third reception power value (the corrected first reception power value) of the UE 200-1 that was corrected by the correction unit 312.

Referring back to FIG. 8, in operation S201, the transceiver 302 of BTS 350 receives, from each of the UEs 200-1, 200-2, and 200-3, a signal indicating the presence or absence of a reception beam formation function, that is, a signal identifying whether the each user equipment has a reception beam formation function or not, and signals indicating the first and second reception power values of the each user equipment. Here, the transceiver 302 further receives, from each of the UEs 200-1, 200-2, and 200-3, a signal indicating the presence or absence of a transmission beam formation function, that is, a signal identifying whether the each UE has a transmission beam formation function or not.

In operation S202, the demodulation and decode unit 304 registers, in the memory 305, for each of the UEs 200-1, 200-2, and 200-3, information on the presence or absence of a reception beam formation function, the first and second reception power values, and information on the presence or absence of a transmission beam formation function.

In operation S203, the correction unit 312 generates a third reception power value by correcting the first reception power value of a user equipment having a transmission beam formation function. For example, since UE 200-1 has a transmission beam formation function, the correction unit 312 of BTS 350 generates the third reception power value by correcting the first reception power value of UE 200-1 in accordance with a gain that is obtained when the UE 200-1 transmits a radio signal to the BTS 350 by performing transmission beam formation. Here, correction unit 312 may obtain the gain, for example, by calculating the ratio of a reception power value obtained when the UE 200-1 transmits a radio signal to the BTS 350 by performing transmission beam formation, to a reception power value obtained when the UE 200-1 transmits a radio signal to the BTS 350 without performing transmission beam formation.

In operation S204, HO selector 306 selects one or more HO-candidate user equipments, from among a plurality of user equipments, based on the third reception power values obtained in operation S203 and the first reception power values received from user equipments each not having a transmission beam formation function. For example, HO selector 306 selects one or more HO-candidate user equipments from among the UEs 200-1, 200-2, and 200-3, based on the third reception power value of UEs 200-1 and the first reception power values of UEs 200-2 and 200-3. For example, HO selector 306 selects, as the one or more HO-candidate user equipments, user equipments having a reception power value that is largest among the first and third reception power values of UEs 200-1, 200-2, and 200-3.

In this example of the second embodiment, as depicted in FIG. 9, the UEs 200-1 and 200-3 that have the largest reception power value are first selected as some of the one or more HO-candidate user equipments, where it is assumed that circles 414 and 446 indicate the same reception power value equal to the largest reception power value. The HO selector 306 further selects, as one of the one or more HO-candidate user equipments, a user equipment whose reception power value falls within a range 430 that is beforehand set, for example, so that the difference between a reception power value within the range 430 and the largest reception power value is equal to or less than a predetermined value.

In the second embodiment, as depicted in FIG. 9, the UE 200-2 is selected as one of the one or more HO-candidate user equipments since the first reception power value of the UE 200-2 falls within range 430, where the range 430 is beforehand set based on the largest reception power value that is taken on by the UEs 200-1 and 200-3. In the example of this embodiment, a user equipment whose reception power value falls within the range 430, which is beforehand set so that the difference between a reception power value within the range 430 and the largest reception power value that is taken on by UEs 200-1 and 200-3 is equal to or less than a predetermined value, is also selected as one of the one or more HO-candidate user equipments.

However, the second embodiment is not limited to this. For example, the HO selector 306 may set a threshold 440 that is an absolute value, as depicted in FIG. 9, and select, as one or more HO-candidate user equipments, user equipments having the first or third reception power values larger than the threshold 440. It is also possible to set threshold 440 in such a manner that the threshold 440 is changed by an operation of the BTS 350.

Referring back to FIG. 8, in operation S205, the HO selector 306 selects a user equipment to be handed over, from among the selected one or more HO-candidate user equipments, based on the first, second, and third reception power values. There are two cases for selecting a user equipment to be handed over from the one or more HO-candidate user equipments as described below.

In the first case where the one or more HO-candidate user equipments each do not have a transmission beam formation function, HO selector 306 selects, from among the selected one or more HO-candidate user equipments, a user equipment having a reception power value that is largest among the first and second reception power values of the selected one or more HO-candidate user equipments, as a user equipment to be handed over.

In the second case where the selected one or more HO-candidate user equipments includes at least one user equipment having a transmission beam formation function, HO selector 306 selects, from among the selected one or more HO-candidate user equipments, a user equipment having a reception power value that is largest among the first, second, and third reception power values of the selected one or more HO-candidate user equipments, as a user equipment to be handed over.

In the example according to the second embodiment, as depicted in FIG. 9, the selected one or more HO-candidate user equipments include UE 200-1 having a transmission beam formation function (the second case mentioned above). In this case, the HO selector 306 selects, as a user equipment to be handed over, a user equipment having a reception power value that is largest among the first, second, and third reception power values of the HO-candidate user equipments 200-1, 200-2, and 200-3. In this example, the second reception power value of the UE 200-1 (the rhombus 420) is largest among the first, second, and third reception power values of UEs 200-1, 200-2, and 200-3, that is, among the reception power values of circles 446, 412, and 414, and rhombuses 420 and 422. Accordingly, the HO selector 306 selects the UE 200-1 (corresponding to the rhombus 420) as a user equipment to be handed over. In FIG. 9, a dotted ellipse 443 enclosing the reception power values of the UE 200-1 schematically illustrates that the UE 200-1 is selected as a user equipment to be handed over.

Referring back to FIG. 8, in operation S206, the HO controller 308 performs handover processing on UE 200-1 that is selected as a user equipment to be handed over. For example, the HO controller 308 generates a control signal requesting the change of an accessible BTS of UE 200-1 from the BTS 350 to the BTS 400, and the transceiver 302 transmits the generated control signal to the UE 200-1.

In operation S207, the HO controller 308 determines whether load balancing is completed. For example, the HO controller 308 determines whether load balancing is completed or not, by determining whether the communication load imposed on the BTS 350 has fallen below a predetermined threshold. When the HO controller 308 determines that load balancing is not completed yet (NO in operation S207), the processing returns to operation S204. Meanwhile, when the HO controller 308 determines that load balancing is completed (YES in operation S207), the processing ends.

As mentioned above, according to the second embodiment, it is possible to not only obtain the advantages of the first embodiment, but also select an optimum user equipment to be handed over, in consideration of the capability of a transmission beam formation provided for each of the plurality of user equipments. For example, in the example of the first embodiment, since the UE 200-1 is distant from the BTS 400, it is determined that interferences largely increase between first radio signals that are transmitted between the UE 200-1 and the BTS 400, and second radio signals that are transmitted between the BTS 300 and the other user equipments belonging to the BTS 300. Thus, the UE 200-1 may not be selected as one of one or more HO-candidate user terminals.

However, although the UE 200-1 is distant from the BTS 400, such the interferences may be suppressed if the UE 200-1 directs a transmission beam of a radio signal to the BTS 400 by performing transmission beam formation. For this reason, in the second embodiment, the capability of transmission beam formation of the UE 200-1 is converted into a reception capability, and the reception power value of the UE 200-1 without reception beam formation is corrected using the converted value. One or more HO-candidate user equipments are then selected using the corrected reception power value (a third reception power value). Thus, according to the second embodiment, it is possible to select the optimum one or more HO-candidate user equipments in consideration of the capability of transmission beam formation that is provided for the user equipments.

In the above examples according to the first and second embodiments, the BTSs 300 and 350 select a user equipment to be handed over and perform the handover processing on the selected user equipment when the BTSs 300 and 350 receive, from the BTS management apparatus 500, an instruction signal requesting the leveling of a communication loads imposed on the BTSs. For this reason, the BTSs select a user equipment to be handed over only when the BTS management apparatus 500 determines that the communication loads imposed on the BTSs should be leveled. As a result, it is possible to reduce a load, imposed on each user equipment, for performing the measurement and transmission of the first and second reception power values, or to reduce a load, imposed on a BTS, for selecting a user equipment to be handed over.

As an alternative to these embodiments, the HO selector 306 may be configured to receive, at predetermined intervals, the first and second reception power values from a plurality of user equipments, to select a user equipment to be handed over, and to store information on the selected user equipment to be handed over in the memory 305. In this case, when the HO controller 308 receives, from the BTS management apparatus 500, an instruction signal requesting the leveling of the communication loads imposed on the BTSs 300 or 350 and the BTS 400, the HO controller 308 performs handover processing on the user equipment lastly selected as a user equipment to be handed over, by referring to information stored in the memory 305. Thus, when the BTS 300 or 350 receives, from the BTS control apparatus 500, an instruction signal requesting the leveling of the communication load imposed on the BTS 300 or 350 and the BTS 400, the BTS 300 or 350 may rapidly perform the handover processing.

Further, although single user equipment is selected as a user equipment to be handed over in the first and second embodiments, embodiments are not limited to this. For example, the HO selector 306 may rank multiple user equipments to be handed over, and register information on the ranked multiple user equipments to be handed over in the memory 305. Thus, the BTS 300 or 350 may rapidly perform handover processing on multiple user equipments to be handed over in the order of ranking.

In the first and second embodiments, the BTS 300 or 350 transmits, to a plurality of user equipments belonging thereto, signals such as an instruction signal requesting the measurement of the first and second reception power values and the transmission of the measured reception power values to the BTS 300 or 350. However, the embodiments are not limited to this. For example, the transceiver 302 of a BTS may be configured to receive, at predetermined intervals, the first reception power values of the plurality of UEs 200, and to transmit an instruction signal requesting the measurement and transmission of the first and second reception power values when the transceiver 302 receives, from the BTS management apparatus 500, an instruction signal requesting the leveling of the communication loads imposed on the BTS 300 or 350 and the BTS 400.

In this case, the transceiver 302 may transmit signals such as an instruction signal requesting the measurement and transmission of the first and second reception power values, to UEs 200 that has a first reception power value smaller than a predetermined threshold. This allows the BTS 300 or 350 to transmit signals, such as an instruction signal requesting the measurement of the first and second reception power values and the transmission of the measured reception power values to the BTS 300 or 350, only to user equipments that are distant from the BTS 300 or 350 out of the plurality of user equipments belonging thereto. As a result, the number of one or more HO-candidate user equipments may be reduced. This allows the BTS 300 or BTS 350 to efficiently select a user equipment to be handed over. For example, it is possible to reduce loads imposed on user equipments that are not selected as the one or more HO-candidate user equipments since the loads caused by the measurement and transmission of the first and second reception power values are reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A base transceiver station for performing handover in a wireless communication network, the base transceiver station comprising:
    a processor to:
        receive first reception power values from a first mobile user equipment and a second mobile user equipment of a plurality of mobile user equipments communicating with the base transceiver station respectively, each of the first reception power values being a reception power value at which each of the first mobile user equipment and the second mobile user equipment receives a radio signal from another base transceiver station without using a reception beam formation function that allows a radio signal transmitted from a specific direction to be selectively received with increased reception sensitivity, the first mobile user equipment being a mobile user equipment without the reception beam formation function, the second mobile user equipment being a mobile user equipment with the reception beam formation function,
        receive a second reception power value from the second mobile user equipment, the second reception power value being a reception power value at which the second mobile user equipment receives a radio signal from the another base transceiver station using the reception beam formation function,
        select, from among the plurality of mobile user equipments, a handover mobile user equipment to be handed over, based on a reception power value that is largest among the first reception power values received from the first mobile user equipment and the second mobile user equipment and the second reception power value received from the second mobile user equipment, and leveling of a communication load of the base transceiver station and another communication load of the another base transceiver station when the communication load is larger than the another communication load, and
        perform handover processing on the handover mobile user equipment so that the base transceiver station with which the handover mobile user equipment wirelessly communicates is changed from the base transceiver station to the another base transceiver station; and
    a memory to:
        store, the first reception power values, and
        store, the second reception power value.

2. The base transceiver station of claim 1, wherein the processor:
    selects, from among the plurality of mobile user equipments, a one or more handover-candidate mobile user equipments each being a candidate for undergoing the handover processing, based on the first reception power values received from the first and the second mobile user equipment; and
    selects, from among the selected one or more handover-candidate mobile user equipments, the handover mobile user equipment based on the first reception power values received from the first mobile user equipment and the second reception power value received from the second mobile user equipment.

3. The base transceiver station of claim 1, wherein the processor:
    selects, from among the plurality of mobile user equipments, a mobile user equipment that has the largest first reception power value among the plurality of mobile user equipments;
    selects, from among the plurality of mobile user equipments, one or more handover-candidate mobile user equipments each having the first reception power value that falls within a predetermined value range from the first reception power value of the selected mobile user equipment; and
    selects, from among the selected one or more handover-candidate mobile user equipments, as the handover mobile user equipment, a mobile user equipment having a reception power value that is largest among the first and second reception power values received from the selected one or more handover-candidate mobile user equipments.

4. The base transceiver station of claim 1, wherein the processor:

selects, from among the plurality of mobile user equipments, one or more handover-candidate mobile user equipments each having the first reception power value larger than a predetermined threshold value; and selects, from among the selected one or more handover-candidate mobile user equipments, as the handover mobile user equipment, a mobile user equipment having a reception power value largest among the first and second reception power values received from the selected one or more handover-candidate mobile user equipments.

5. The base transceiver station of claim 2, wherein when the one or more handover-candidate mobile user equipments each have a reception beam formation function, the processor selects, from among the one or more handover candidate mobile user equipments, as the handover mobile user equipment, a mobile user equipment having the largest second reception power value among the one or more handover-candidate mobile user equipments;

when the one or more handover-candidate mobile user equipments each do not have a reception beam formation function, the processor selects, from among the one or more handover-candidate mobile user equipments, as the handover mobile user equipment, a mobile user equipment having the largest first reception power value among the one or more handover-candidate mobile user equipments; and when the one or more handover-candidate mobile user equipments include both at least one mobile user equipment having a reception beam formation function and at least one mobile user equipment not having the reception beam formation function, the processor selects, from among the selected one or more handover-candidate mobile user equipments, as the handover mobile user equipment, a mobile user equipment having a reception power value that is largest among the first and second reception power values received from the one or more handover-candidate mobile user equipments.

6. The base transceiver station of claim 1, wherein the plurality of mobile user equipments includes a second set of one or more mobile user equipments each having a transmission beam formation function that allows a radio signal to be selectively transmitted in a predetermined direction with increased strength;

the processor generates a third reception power value by correcting the first reception power value received from each of the second set of one or more mobile user equipments according to a capability of the transmission beam formation function provided for the each of the second set of one or more mobile user equipments;

the processor selects, from among the plurality of mobile user equipments, one or more handover-candidate mobile user equipments each being a candidate for undergoing the handover processing, based on the third reception power values of the second set on one or more mobile user equipments in addition to the first reception power values; and the processor selects, from among the one or more handover-candidate mobile user equipments, the handover mobile user equipment based on the first, second, and third reception power values obtained from the one or more handover-candidate mobile user equipments.

7. The base transceiver station of claim 1, wherein the processor selects, at a predetermined intervals, the handover mobile user equipment and stores information on the handover mobile user equipment in the memory; and the processor performs the handover processing on the handover mobile user equipment whose information is being stored in the memory when the processor receives, from a management device for monitoring communication loads imposed on the base transceiver station and the another base transceiver station, an instruction signal requesting the base transceiver station to level the communication loads imposed on the base transceiver station and the another base transceiver station.

8. The base transceiver station of claim 7, wherein when the processor receives, from the management device, the instruction signal requesting the base transceiver station to level communication loads imposed on the base transceiver station and the another base transceiver station, the processor transmits, to each of the plurality of mobile user equipments, a reception-power-value request signal for requesting the each of the plurality of mobile user equipments to measure the first and second reception power values and to transmit the measured first and second reception power values to the base transceiver station.

9. The base transceiver station of claim 1, wherein the processor receives, at a predetermined intervals, the first reception power value from the plurality of mobile user equipments; and when the processor receives an instruction signal requesting the base transceiver station to level communication loads imposed on between the base transceiver station and the another base transceiver station from a management device, the processor:

selects, from among the plurality of mobile user equipments, one or more handover-candidate mobile user equipments each having the first reception power value smaller than a predetermined value, and transmits, to each of the one or more handover-candidate mobile user equipments, an instruction signal requesting the each of the one or more handover-candidate mobile user equipments to measure the first and second reception power values and to transmit the measured first and second reception power values to the base transceiver station.

10. A mobile user equipment for performing handover from a base transceiver station to another base transceiver station in a wireless communication network, the mobile user equipment comprising:

a processor to:

measure a first reception power value that is a reception power value at which the mobile user equipment wirelessly receives a radio signal from the another base transceiver station without using a reception beam formation function that allows a radio signal transmitted from a specific direction to be selectively received with increased reception sensitivity, the mobile user equipment being a mobile user equipment without the reception beam formation function, the reception beam formation function allowing a radio signal transmitted from a predetermined direction to be selectively received with increased reception sensitivity, measure a second reception power value that is a reception power value at which the mobile user equipment receives a radio signal from the another base transceiver station using the reception beam formation function, transmit the measured first and second reception power values to the base transceiver station, and perform handover processing by which a base transceiver station with which the mobile user equipment is communicating is changed from the base transceiver station to the another base transceiver station when the mobile user equipment to be handed over is selected from among a plurality of mobile user equipments and determined to undergo the handover processing by the base transceiver station based on a reception power value that is largest among the first and second power reception values and the first power reception value from another mobile user equipment of the plurality of mobile user equipments, and leveling of communication loads on the base transceiver stations to a base station having a larger communication load, wherein the another mobile user equipment being a mobile user equipment with the reception beam formation function that measures the first reception power value that is a reception power value at which the mobile user equipment receives a radio signal from the another base transceiver station without using a reception beam formation function; and a memory to store the first and second reception power values measured by the processor.

11. A system for performing handover from a base transceiver station to another base transceiver station in a wireless communication network, the system comprising:

a plurality of mobile user equipments allowed wirelessly to communicate with the base transceiver station, the plurality of mobile user equipments including a first mobile user equipment without, a reception beam formation function that allows a radio signal transmitted from a predetermined direction to be selectively received with increased reception sensitivity, and a second mobile user equipment having the reception beam formation function, the first and second mobile user equipment being configured to:

measure a first reception power value that is a reception power value at which the first mobile user equipment and the second mobile user equipment receive a radio signal from the another base transceiver station without the reception beam formation function, and transmit the measured first reception power value to the base transceiver station, the second mobile user equipment further configured to:

measure a second reception power value that is a reception power value at which the second mobile user equipment receives a radio signal from the another base transceiver station using the reception beam formation function, and transmit the measured second reception power value to the base transceiver station; and the base transceiver station configured to:

receive the first reception power value from the first and second mobile user equipment, receive the second reception power value from the second mobile user equipment, select, from among the plurality of mobile user equipments, a handover mobile user equipment to be handed over, based on a reception power value that is largest among the first reception power values received from the first and second mobile user equipment and the second reception power values received from the second mobile user equipment, and leveling of a communication load of the base transceiver station and another communication load of the another base transceiver station when the communication load is larger than the another communication load, and perform handover processing on the handover mobile user equipment so that the base transceiver station with which the mobile user equipment is communicating is changed from the base transceiver station to the another base transceiver station.

12. A method for performing handover from a base transceiver station to another base transceiver station in a wireless communication network in which a plurality of mobile user equipments are allowed to wirelessly communicate with the base transceiver station, the method comprising:

providing a first mobile user equipment included in the plurality of mobile user equipments without a reception beam formation function that allows a radio signal transmitted from a predetermined direction to be selectively received with increased reception sensitivity, and a second mobile user equipment included in the plurality of mobile user equipments with the beam formation function;

receiving, by the base transceiver station, from the first and second mobile user equipment, a first reception power value that is a reception power value at which the first and second mobile user equipment receives a radio signal from the another base transceiver station without using the reception beam formation function;

receiving, by the base transceiver station, from the second mobile user equipment, a second reception power value that is a reception power value at which the second mobile user equipment receives a radio signal from the another base transceiver station using the reception beam formation function;

selecting, by the base transceiver station, from among the plurality of mobile user equipments, a handover mobile user equipment to be handed over, based on a reception power value that is largest among the first reception power values received from the first and second mobile user equipment and the second reception power values received from the second mobile user equipment, and leveling of a communication load of the base transceiver station and another communication load of the another base transceiver station when the communication load is larger than the another communication load; and performing handover processing on the handover mobile user equipment so that a base transceiver station with which the handover mobile user equipment is in communication with is changed from the base transceiver station to the another base transceiver station.

* * * * *